Figure 2:
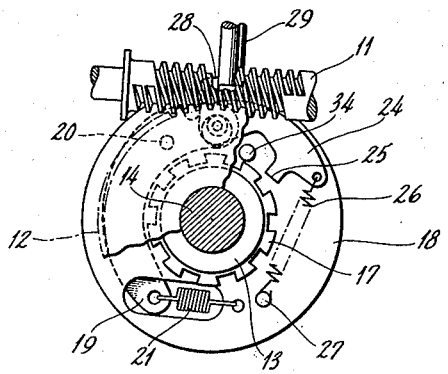

Aug. 4, 1953

W. A. ANDERSON 2,647,600

OVERLOAD RELEASE DEVICE

Filed Oct. 13, 1951

INVENTOR.
WALTER A. ANDERSON

BY Jesse A. Holton

ATTORNEY

Patented Aug. 4, 1953

2,647,600

UNITED STATES PATENT OFFICE 2,647,600

OVERLOAD RELEASE DEVICE

Walter A. Anderson, Trumbull, Conn., assignor to Underwood Corporation, New York, N. Y., a corporation of Delaware Application October 13, 1951, Serial No. 251,175

6 Claims. (Cl. 192—56)

The present invention deals with an overload release device such as a clutch or coupling and with regard to certain more specific features to an overload release clutch of the positive drive type.

It is an object of this invention to provide an improved positive drive clutch which will automatically become disengaged upon the imposition of a predetermined load on the driven member.

It is a further object of this invention to provide an improved positive drive clutch which will automatically become disengaged upon overload and which will sound an audible signal upon becoming disengaged.

These and further objects, features and advantages will become apparent as the description of a preferred embodiment of the invention proceeds.

Figure 3:
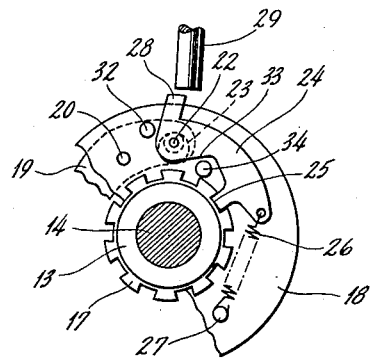
Figure 1:
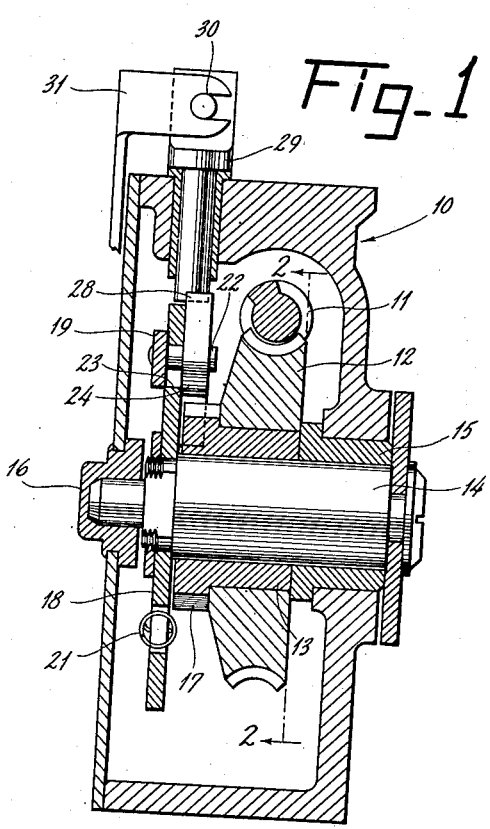
Figure 4:
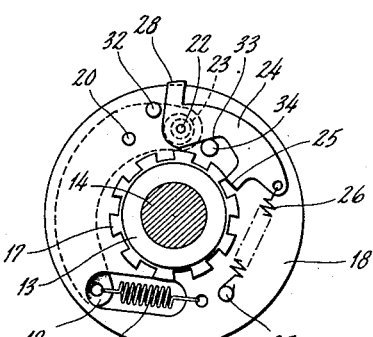

Referring now to the drawing:

Figure 1 is a sectional view of a power transmission including the overload release device of the present invention, Figure 2 is a view taken along the line 2—2 of Figure 1 with a portion of the driving member broken away to illustrate the automatic releasing mechanism, the clutch being shown fully disengaged, Figure 3 is a view generally similar to Figure 2 and showing the clutch fully engaged, and Figure 4 is a view showing the clutch disengaged but with the parts in position for sounding an alarm.

The transmission with which the clutch of the present invention has been illustrated is mounted in a housing generally designated in Figure 1 at 10. The main drive, which may be from an electric motor or other power source, not shown, is in the form of a worm 11 meshing with a worm wheel 12 secured to a sleeve 13 by means of a force fit, key, or other suitable means so that the sleeve 13 rotates with the worm wheel 12. The sleeve 13 is rotatable upon a shaft 14 which shaft is rotatably mounted in a pair of bearings 15 and 16 secured to the housing 10. At one end the sleeve 13 is provided with a series of flat-sided, generally square teeth 17, and the sleeve 13 with its teeth 17 constitutes the driving member of the clutch. The driven member of the clutch is in the form of a disk 18 splined or otherwise secured to the driven shaft 14.

A lever 19 is pivotally mounted at 20 upon one side of the disk 18 and is urged about its pivot in a counterclockwise direction as viewed in the drawing, by means of a spring 21 extending between one end of said lever and the disk 18.

A pin 22 is secured to the end of the lever 19 opposite from the end to which the spring 21 is connected and extends through an enlarged opening 23 provided in the disk 18. The pin 22 serves as a floating pivot for a pawl 24 loosely mounted thereupon on the side of the disk 18 opposite from the lever 19. The pawl 24 is provided with a square tooth 25, and a relatively light spring 26, extending between one end of the pawl 24 and a pin 27 on the disk 18, urges the pawl about its pivot in a direction to engage the tooth 25 with the teeth 17 of the driving member of the clutch.

The pawl 24 is provided with an ear 28 for cooperation with a plunger or other suitable clutch disengaging means 29. In the particular embodiment illustrated in the drawing, the plunger 29 is slidably mounted in the housing 10 and is connected at its upper end by pin-and-slot connection 30 to a member 31 which may be manually raised to move the plunger 29 out of the path of movement of the ear 28 to thereby permit the spring 26 to move the tooth 25 into engagement with the driving member. With the plunger 29 in its lowered position, shown in Figures 1 and 2, attempted rotation of the disk 18 presses the ear 28 against the side of the plunger to thereby rock the pawl 24 in a counterclockwise direction to remove the tooth 25 from engagement with the teeth 17 and completely disengage the clutch. A pin 32 mounted in the disk 18 serves to limit the movement of the pawl when the clutch is disengaged.

The direction of rotation as viewed in Figures 2, 3 and 4, is clockwise so that the power is transmitted from the driving member 13 to the disk 18 substantially along a line between the center of the teeth 17 which is engaged by the pawl tooth 25 and the pivot 22, thus the force of the drive tends to rock the lever 19 in a clockwise direction against the action of the spring 21, the spring 21 of course urging the pivot 22 outwardly away from the center of rotation and from the point of contact between the teeth 17 and the tooth 25.

When the load on the driven member becomes sufficient to overcome the force of the spring 21, the lever 19 is rocked in a clockwise direction, thereby moving the pivot 22 closer to the center of rotation of the driving and driven members. The particular transmission illustrated is for use in an adding machine where a tie-up in the computing mechanism may result in a complete stoppage of the driven member 18 and for that reason the tension of the spring 21 is not particularly important since the computing mechanism can stand an overload sufficient to stretch a fairly strong spring. However, if it is desired to have this clutch automatically released upon the load on the driven member reaching a particular value, suitable means may be provided to adjust the tension of the spring 21 to any desired value, as will be obvious to one skilled in the art. As the pivot 22 moves inward, an edge 33 of the pawl 24 strikes a pin 34 provided upon the disk 18 and the pawl 24 is thereby rocked about its pivot 22 in a counterclockwise direction to withdraw the tooth 25 from driving engagement with the teeth 17. Of course it is obvious that the disk 18 may be the driving member and the sleeve 13 the driven member, in which case the transmission would be modified to eliminate the worm and worm wheel.

The pin 33 is so positioned that with the pivot 22 in its inwardmost position, the flat end of the tooth 25 is barely in engagement with the outer flat ends of the teeth 17 and is resiliently held in that position by the spring 26 to thereby produce a chattering noise as long as the driving member continues to rotate, thus producing an audible signal indicating to the operator that an overload condition exists and that the power should be shut off.

Having thus described the invention, what is claimed is:

1. A positive drive overload release clutch comprising a toothed driving member, a driven member, a floating pivot carried by said driven member, a tooth carrying pawl mounted upon said floating pivot, resilient means urging said pivot away from the teeth of said driving member, a relatively light spring urging said pawl about said pivot in a direction to engage the tooth thereof with the teeth of said driving member, means operable upon a predetermined load being imposed upon said driven member to move said pivot toward the teeth of said driving member, and means on said driven member operable upon movement of said pivot toward the teeth of the driving member to engage said pawl and rock it about said pivot in a direction to move the tooth said pawl out of driving engagement with said toothed driving member.

2. A positive drive overload release clutch comprising a driving member and a driven member, a series of teeth on one of said members, a floating pivot carried by the other of said members, a tooth carrying pawl mounted upon said floating pivot, resilient means urging said pivot outwardly generally away from the center of rotation of said driving and driven members, a relatively light spring urging said pawl in a direction to engage the tooth thereof with the teeth of the other member, means operable upon a predetermined load being imposed on the driven member to move said pivot inwardly against the action of said resilient means, and means on the member carrying said pivot to cooperate with said pawl when said pivot moves inwardly to rock said pawl about said pivot in a direction to move the tooth of said pawl out of driving engagement with the teeth of the other member.

3. A positive drive overload release clutch comprising a toothed driving member, a driven member, a lever pivotally mounted upon said driven member, a spring urging one end of said lever in a direction away from the teeth of the driving member, a tooth carrying pawl pivotally mounted upon said one end of said lever, a relatively light spring urging said pawl about its pivot in a direction to engage the tooth thereof with the toothed driving member, said parts being so constructed and arranged that when a predetermined load is imposed upon the driven member the pivot of said pawl will be moved toward the teeth of the driving member, and means on said driven member operable upon the movement of the pivot of said pawl to engage said pawl and rock it about its pivot in a direction to move the tooth thereof out of driving engagement with said toothed driving member.

4. A positive drive overload release clutch comprising a toothed driving member, a driven member, a lever pivotally mounted upon said driven member, a spring urging one end of said lever outwardly generally away from the center of rotation of said driving and driven members, a tooth carrying pawl pivotally mounted upon the outwardly urged end of said lever, a relatively light spring urging said pawl in a direction to engage the tooth thereof with the toothed driving member, whereby upon a predetermined load being imposed on the driven member the pivot of said pawl will be moved inwardly, and means on said driven member operable upon the inward movement of the pivot of said pawl to engage said pawl and rock it about its pivot in a direction to move the tooth thereof out of driving engagement with said toothed driving member.

5. A positive drive overload release clutch comprising a driving member having flat edged teeth, a driven member, a floating pivot carried by said driven member, a square toothed pawl mounted upon said floating pivot, a relatively light spring urging said pawl about said pivot in a direction to drivingly engage the square tooth thereof with the teeth of the driving member, said pivot being normally on a line running through the edge of the tooth of the driving member which is engaged by the tooth of said pawl and perpendicular to said edge, resilient means urging said pivot away from the point of contact between the teeth of the driving member and the tooth of said pawl, said resilient means being adapted to yield under a predetermined load imposed on the driven member to thereby permit said pivot to move, means on the driven member to cooperate with said pawl upon the movement of said pivot to rock said pawl in a direction to disengage the tooth thereof from the edge of the tooth of the driving member.

6. A positive drive overload release clutch comprising a driving member having substantially square teeth, a driven member, a floating pivot carried by said driven member, a square toothed pawl mounted upon said floating pivot, a relatively light spring urging said pawl about said pivot in a direction to drivingly engage the square tooth thereof with the teeth of the driving member, said pivot being normally on a line running through the edge of the tooth of the driving member which is engaged by the tooth of said pawl and perpendicular to said edge, resilient means urging said pivot away from the point of contact between the teeth of the driving member and the tooth of said pawl, said resilient means being adapted to yield under a predetermined load imposed on the driven member to thereby permit said pivot to move, means on the driven member to cooperate with said pawl upon the movement of said pivot to rock said pawl about said pivot far enough to disengage the tooth thereof from the edge of the tooth of the driving member, said relatively light spring then resiliently holding the tooth of the pawl in position to be struck by the flat ends of the teeth of the driving member to produce a chattering noise signifying the existence of an overload condition.

WALTER A. ANDERSON.

References Cited in the file of this patent

UNITED STATES PATENTS

| Number | Name | Date |
|---|---|---|
| 1,548,427 | Aldeen | Aug. 4, 1925 |
| 1,914,795 | Andres | June 20, 1933 |
| 2,056,666 | Geldhof | Oct. 6, 1936 |
| 2,150,227 | Lake et al. | Mar. 14, 1939 |